(12) United States Patent
Knirsch

(10) Patent No.: US 8,578,180 B2
(45) Date of Patent: Nov. 5, 2013

(54) DYNAMIC TUNING OF COMPUTING SYSTEMS

(75) Inventor: Philipp Knirsch, Kirchentellinsfurt (DE)

(73) Assignee: Red Hat, Inc., Raleigh, NC (US)

( * ) Notice: Subject to any disclaimer, the term of this patent is extended or adjusted under 35 U.S.C. 154(b) by 855 days.

(21) Appl. No.: 12/579,319

(22) Filed: Oct. 14, 2009

(65) Prior Publication Data

US 2011/0087911 A1    Apr. 14, 2011

(51) Int. Cl.
*G01F 1/32* (2006.01)

(52) U.S. Cl.
USPC ........... 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| | | | |
|---|---|---|---|
| RE39,284 E * | 9/2006 | Marisetty ...................... 713/324 |
| 7,191,325 B2 * | 3/2007 | Zunke ............................... 713/1 |
| 7,380,089 B2 * | 5/2008 | Herger et al. ................. 711/170 |
| 7,562,234 B2 * | 7/2009 | Conroy et al. ................ 713/300 |
| 7,711,966 B2 * | 5/2010 | Prabhakaran et al. ........ 713/300 |
| 7,788,516 B2 * | 8/2010 | Conroy et al. ................ 713/340 |
| 7,793,126 B2 * | 9/2010 | McGrane et al. ............. 713/320 |
| 7,802,120 B2 * | 9/2010 | Conroy et al. ................ 713/340 |
| 7,984,311 B2 * | 7/2011 | Brumley et al. .............. 713/300 |
| 2001/0030468 A1 * | 10/2001 | Anderson et al. ............... 307/31 |
| 2005/0182986 A1 * | 8/2005 | Anderson et al. ............. 713/340 |
| 2008/0178019 A1 * | 7/2008 | McGrane et al. ............. 713/320 |
| 2008/0250415 A1 * | 10/2008 | Illikkal et al. ................. 718/103 |
| 2009/0198385 A1 * | 8/2009 | Oe et al. ........................ 700/296 |
| 2009/0235056 A1 * | 9/2009 | Hirai et al. .................... 712/220 |

\* cited by examiner

*Primary Examiner* — M Elamin
(74) *Attorney, Agent, or Firm* — Lowenstein Sandler LLP

(57) ABSTRACT

Some embodiments of a system and a method to dynamically tune a computing system have been presented. In one embodiment, a processing device running in a computing system monitors usage of one or more hardware components of the computing system to determine a load on each hardware component. The processing device may tune each hardware component based on the load of a respective hardware component determined, and a respective weight associated with the respective hardware component. The hardware components may be tuned to reduce power consumption or to improve performance of the computing system.

27 Claims, 3 Drawing Sheets

DYNAMIC TUNING OF COMPUTING SYSTEMS

TECHNICAL FIELD

Embodiments of the present invention relate to power and performance management in a computing system, and more specifically to dynamic tuning of a computing system.

BACKGROUND

Power and performance management has been an important aspect in the design and usage of computing systems. Even with the significant advancement in computing technology, inefficient power usage in computing systems remains a concern in many situations.

Conventionally, power management in a computing system, such as a server, is accomplished by hardware. For example, additional hardware (such as a variable impedance circuit) is added to one conventional computing system to modify the overall load of the computing system in order to reduce power consumption. In another example, the settings of existing hardware components in one conventional computing system are adjusted in order to achieve the appropriate level of power consumption.

Because many of the conventional power management techniques utilize hardware to adjust the level of power usage, it is generally difficult, if not infeasible, for software running on a conventional computing system to directly manage power in order to tailor power delivery and usage to the needs of applications running on the computing system, let alone balancing power consumption against performance of the computing system.

BRIEF DESCRIPTION OF THE DRAWINGS

The present invention is illustrated by way of example, and not by way of limitation, in the figures of the accompanying drawings and in which.

DETAILED DESCRIPTION

Figure 1:
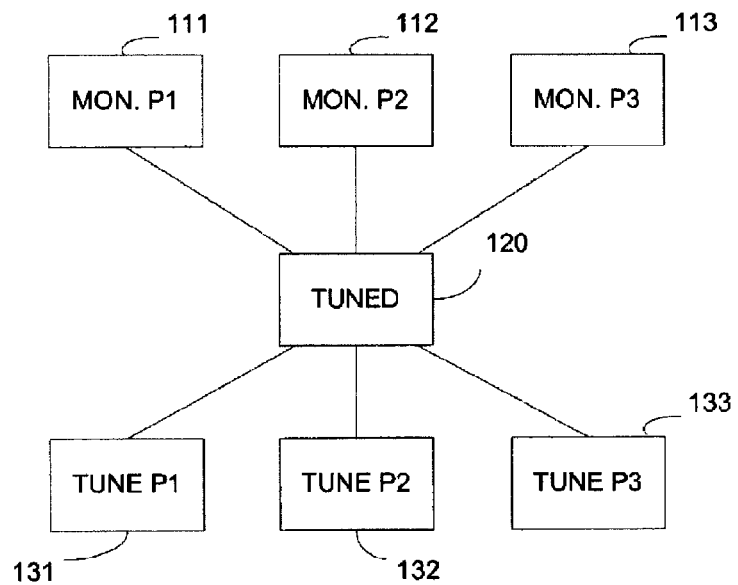
FIG. 1 illustrates one embodiment of monitor plugins, tuning plugins, and interfacing middleware between the monitor plugins and tuning plugins.

Described herein are some embodiments of a method, an apparatus, and a system to dynamically tune a computing system. In one embodiment, a processing device running in a computing system monitors usage of one or more hardware components of the computing system to determine a load on each hardware component. The processing device may tune each hardware component based on the load of a respective hardware component determined, and a respective weight associated with the respective hardware component. The hardware components may be tuned to reduce power consumption or to improve performance of the computing system. More details of some embodiments of how to dynamically tune a computing system are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "monitoring" or "tuning" or "executing" or "registering" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a set of monitor plugins and tuning plugins usable to dynamically tune a computing system, such as a server, a personal computer (PC), a handheld device (e.g., a personal digital assistant), etc. Referring to FIG. 1, there are a set of three monitor plugins 111-113 and three tuning plugins 131-133. All monitor plugins 111-113 and tuning plugins 131-133 are logically coupled to a middleware module, tuned module 120. Note that in other embodiments, there may be more or fewer monitor plugins and/or tuning plugins. Furthermore, the number of monitor plugins and the number of tuning plugins may or may not be the same in some embodiments.

In general, the monitor plugins 111-113 are for monitoring different sources, which are hardware components in the computing system (e.g., processing device, disk, network card, sound card, memory, etc.). In some embodiments, each of monitor plugins 111-113 includes a getLoad( ) method that returns a value between a predetermined range, such as 0-100. Likewise, the tuning plugins 131-133 are generally for tuning different targets, which are hardware components in the computing system (e.g., processing device, disk, network card, sound card, memory, etc.); and may tune in different modes. In some embodiments, there are two modes, namely, power reduction and performance improvement. Each tuning plugins 131-133 can set various weights for any monitoring sources. The weights may be within a predetermined range, such as 0-100. Each tuning plugin has a setTuning(load) method. Tuning may be based on accumulated products of load and weight (i.e., load*weight) for each target.

In some embodiments, tuned module 120 is the main interface and aggregator, acting as middleware between monitor plugins 111-113 and tuning plugins 131-133. Tuned module 120 may provide only general functionalities (such as aggregating loads collected from monitor plugins 111-113), while leaving specific functionalities to monitor plugins 111-113 and tuning plugins 131-133. Tuned module 120 may maintain a list of monitor plugins 111-113 and tuning plugins 131-133, which have initially registered with tuned module 120. In some embodiments, the monitoring interval is configurable, where there is only one wakeup per monitoring interval to reduce the number of wakeups. Furthermore, the weight for each of monitor plugins 111-113 may be set for each of tuning plugin 131-133. In one embodiment, the default weight is set to zero (0). For example, an aggregated load may be computed as follows:

$$mon\text{-}p.getLoad(\ )*tune\text{-}p.weights[mon\text{-}p]/100$$

In one embodiment, where all weights combined is equal to 100, then the above formula provides a balanced and normalized load. Note that the aggregated weight per tuning plugin can be greater than 100, or smaller than 100. Tuned module 120 may or may not be set to automatically normalize the aggregated load.

In some embodiments, tuning aggressiveness may be adjusted by tuned module 120 as well. Tuning aggressiveness may be specified to be within a predetermined range, such as 0-100, where an aggressiveness of 0 means no tuning at all, while an aggressiveness of 100 means always fully tuned even under full load. Note that tuning aggressiveness may be configurable globally for all tuning plugins 131-133 or individually. As mentioned above, tuning plugins 131-133 have two modes, namely, power reduction and performance improvement. The mode of tuning pluggins 131-133 may be set in system and/or user settings of the computing system.

Each of monitor plugins 111-113 and tuning plugins 131-133 may be disabled completely. Furthermore, tuned module 120 may use external interfaces (e.g., a graphical user interface) to allow requests for monitoring applications.

In some embodiments, monitor plugins 111-113 can be based on any source, such as collected or stap scripts. Each of the monitor plugins 111-113 is registered to tuned module 120 via registerMonitorPlugin( ). Furthermore, each of the monitor plugins 111-113 has its own configuration. The only external interface to tuned module 120 is getLoad( ), which may return a list of tuples. Details of getLoad( ) have been discussed above. Furthermore, each of the monitor plugins 111-113 is in a specific category. Some examples of the categories to be monitored include processing device (also referred to as central processing unit (CPU)), disk input/output (IO), network IO, memory IO, Universal Serial Bus (USB) ports, graphics-related components (e.g., graphics processor, etc.), and external input devices (e.g., mouse, keyboard, etc.). In some embodiments, sub-categories may be defined, such as input, output, blocksize, etc. Note that excessive monitoring of disk IO and network IO is generally avoided to reduce unnecessary wakeups. Note that monitor plugins 111-113 generally monitor the usage of the respective hardware components based on applications running on the computing system, instead of monitoring user interaction with the respective hardware components or the computing system.

Unlike monitoring plugins 111-113, tuning plugins 131-133 are hardware specific. Each of tuning plugins 131-133 is registered to tuned module 120 via registerTuningPlugin( ). For known problems with certain hardware components, tuned module 120 may maintain a blacklist to keep track of the affected hardware components and the associated tuning plugins. In some embodiments, there are two types of tuning plugins, namely, power reduction and performance improvement. Each of the tuning plugins 131-133 may define its own policy to handle different levels of aggregated load. In some embodiments, each of the tuning plugins 131-133 has an interface called setTuning(load), where "load" is the aggregated load for that tuning plugin modified by the specific or overall level of tuning aggressiveness. There may be several levels of tuning aggressiveness, such as none, low, medium, high, max. Some examples of hardware components that can be tuned by tuning plugins 131-133 include processing device, disk IO, network IO, memory IO, USB ports, graphics related hardware components, and external input devices (e.g., mouse, keyboard, etc.).

Figure 2:
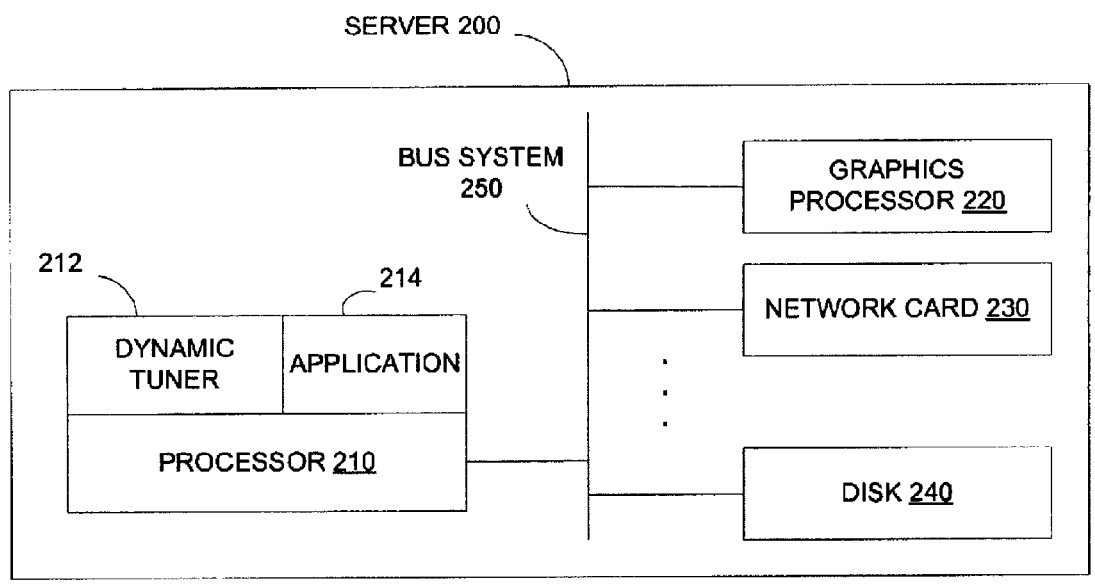
FIG. 2 illustrates one embodiment of a server.

FIG. 2 illustrates one embodiment of a server usable in some embodiments of the invention. Note that the server 200 is merely one example of computing systems in which the dynamic tuning techniques disclosed herein can be applied. The server 200 includes a processing device 210, and various other hardware components, such as graphics processor 220, network card 230, and disk 240, interconnected to each other via a bus system 250. It should be appreciated that other embodiments of the server 200 may include more or fewer number of hardware components, and/or different types of hardware components. In some embodiments, there is a dynamic tuner 212 and an application 214 executable on the processing device 210. Note that there may be additional applications running on the processing device 210 as well.

In some embodiments, the application 214 running on the processing device 210 uses at least some of the hardware components in the server 200. The processing device 210 may execute the dynamic tuner 212 to monitor the usage of the hardware components of the application 214 and then tune the hardware components based on the data collected from monitoring. The purpose of the tuning may be to reduce power consumption by the hardware components or to improve performance of the server 200. The dynamic tuner 212 may include monitor plugins and tuning plugins, and middleware interfacing between the monitor plugins and tuning plugins. Details of some embodiments of the monitor plugins, tuning plugins, and middleware have been discussed above with reference to FIG. 1. To further illustrate the concept, some examples are further discussed below.

In one example, both the source monitored and the target tuned is the network card 230. When the data collected from monitoring (e.g., load of the network card 230) indicates that the network card 230 has been unused by the application 214 over a long period of time, the dynamic tuner 212 may lower the speed of the network card 230, put the network card 230 in a lower power mode, or even shut down the network card 230. As a result, the power used by the network card 230 may be reduced and the power saved may be delivered to the processing device 210, which may then increase its operating frequency in order to improve performance. If at any later point, the network card 230 is used more frequently again, then this may be detected by the monitoring plugin and the tuning plugin may then in turn increase the speed of the network card 230 and/or put the network card 230 into a higher power mode again.

In another example, both the source monitored and the target tuned is the disk 240. When the data collected from monitoring indicates that the disk's input/output activities have dropped below a predetermined level over a certain period of time, the dynamic tuner 212 may cause the disk 240 to enter into a lower power state in order to reduce power.

Figure 3:
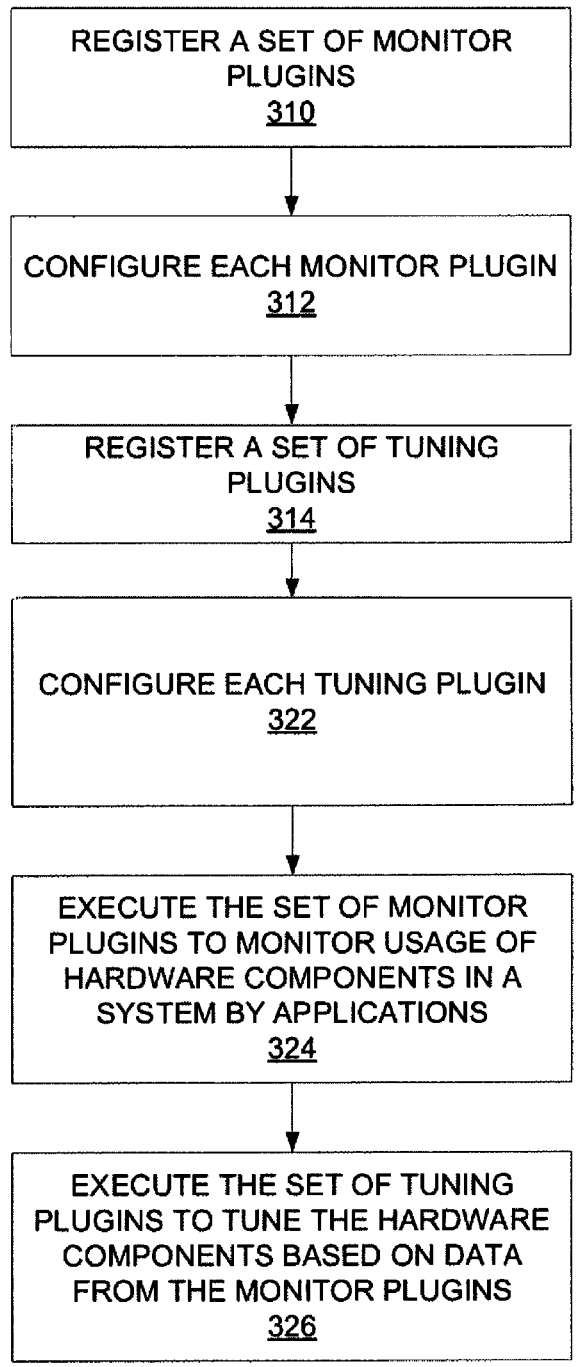
FIG. 3 illustrates a flow diagram of one embodiment of a method to dynamically tune a computing system.

FIG. 3 illustrates a flow diagram of one embodiment of a method to dynamically tune a computing system. The method may be performed by processing logic that may comprise hardware (e.g., circuitry, dedicated logic, programmable logic, microcode, etc.), software (such as instructions run on a processing device), firmware, or a combination thereof. For instance, the server 200 illustrated in FIG. 2 may perform at least part of the method in some embodiments.

Initially, processing logic registers a set of monitor plugins (processing block 310). Then processing logic configures each monitor plugin (processing block 312). In some embodiments, the monitor interval and weight of the load returned by each monitor plugin are configurable. Users of the computing system (e.g., an administrator) may set the monitor interval and the weight to the desired level. Details of some embodiments of monitor plugins have been discussed above with reference to FIG. 1.

Next, processing logic registers a set of tuning plugins (processing block 314). Then processing logic configures each tuning plugin (processing block 322). For instance, parameters that may be configurable include aggregate load, tuning mode, tuning aggressiveness, etc. Details of some embodiments of tuning plugins have been discussed above with reference to FIG. 1.

In some embodiments, processing logic executes the monitor plugins to monitor the usage of hardware components of the computing system by applications running on the computing system (processing block 324). Then processing logic executes the tuning plugins to dynamically tune one or more of the hardware components based on the data collected from the monitor plugins (processing block 326). Details of some embodiments of the operations of the monitor plugins and tuning plugins have been discussed above with reference to FIG. 1.

Figure 4:
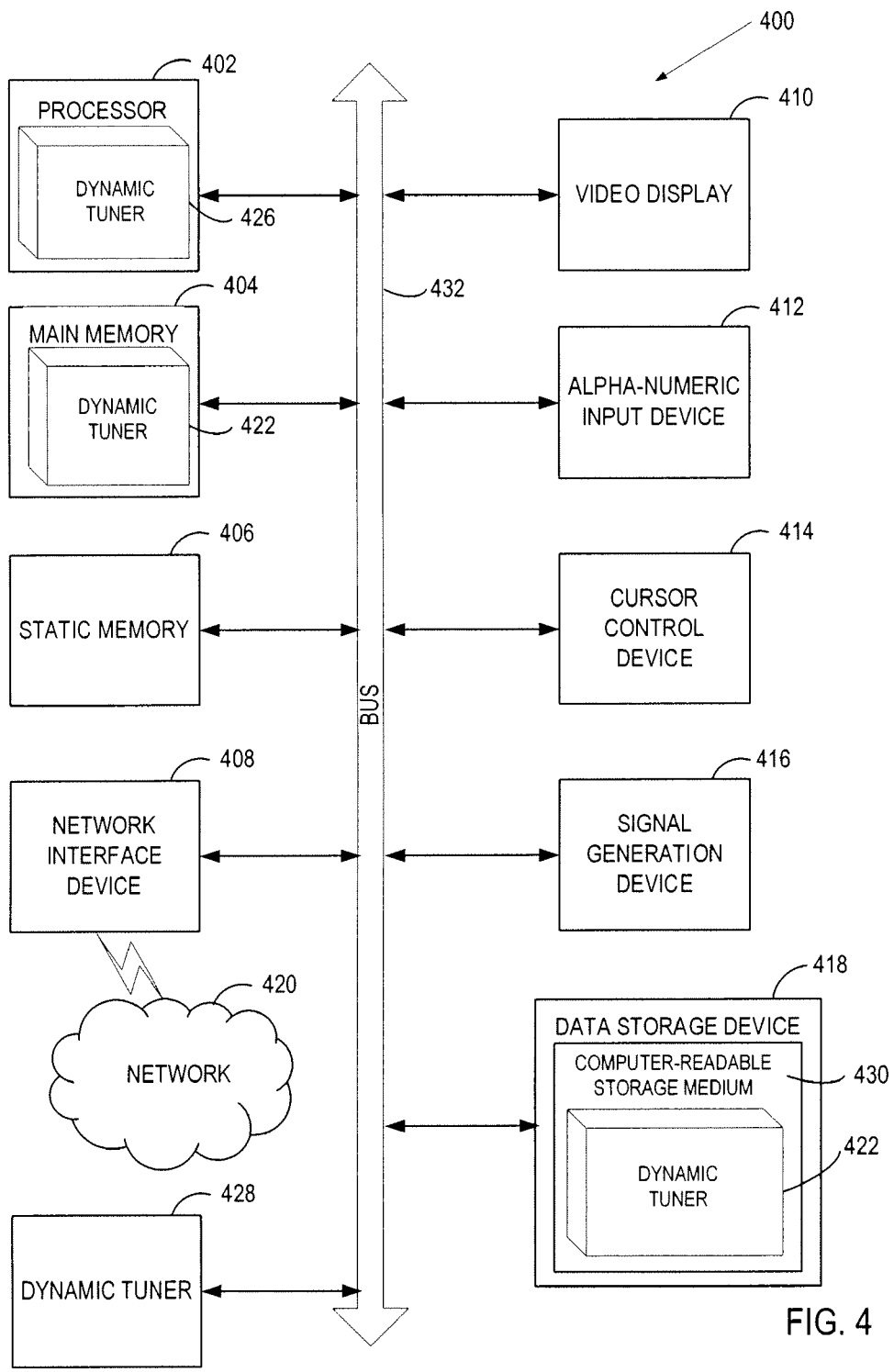
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the dynamic tuner 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., dynamic tuner 422) embodying any one or more of the methodologies or functions described herein. The dynamic tuner 422 may also reside, completely or at least partially, within the main memory 404 and/or within the processing device 402 during execution thereof by the computer system 400, the main memory 404 and the processing device 402 also constituting computer-accessible storage media. The dynamic tuner 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The dynamic tuner 428, components and other features described herein (for example, in relation to FIGS. 1 and 2) can be implemented as discrete hardware components or integrated into the functionalities of hardware components, such as ASICS, FPGAs, DSPs, or similar devices. In addition, the dynamic tuner 428 can be implemented as firmware or functional circuitries within hardware devices. Further, the dynamic tuner 428 can be implemented in any combination of hardware devices and software components.

Thus, some embodiments of a system and a method to dynamically tune a computing system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
monitoring, by a processing device, usage of a hardware component of a computing system to determine a load on the hardware components;
tuning, by the processing device, the hardware component based on the load determined and a weight associated with the hardware component;
registering, by the processing device, at least one of a monitor plugin and a tuning plugin, wherein the at least one of the monitor plugin and the tuning plugin are associated with the hardware component; and
executing, by the processing device, the at least one of the registered monitor plugin and the tuning plugin.

2. The method of claim 1, wherein tuning, by the processing device, the hardware component comprises tuning the hardware component to reduce power consumption by the hardware component during execution of an application.

3. The method of claim 1, wherein tuning, by the processing device, the hardware component comprises tuning the hardware component to improve performance by the hardware component during execution of an application.

4. The method of claim 1, wherein the hardware component comprises a network card, and tuning the hardware component comprises:
shutting down the network card, by the processing device, when the data from the monitoring indicates that the network card has been unused over a predetermined period of time.

5. The method of claim 1, wherein the hardware component comprises a disk, and tuning the hardware component comprises:
causing, by the processing device, the disk to enter a lower power state when the data from the monitoring indicates that a level of activities by the disk has dropped below a predetermined threshold over a predetermined period of time.

6. The method of claim 1
wherein the at least one monitor plugin is associated with one of a plurality of categories of the hardware component; and
the at least one registered monitor plugin is executed to monitor the usage of the hardware component in the category.

7. The method of claim 1
wherein the at least one registered tuning plugin to tune the hardware component based on data from the monitoring and a pre-selected level of tuning aggressiveness of the tuning plugin.

8. The method of claim 1, wherein the one or more hardware components include a central processing unit, a disk input/output (I/O) device, a memory I/O device, a network I/O device, an I/O port connectable to a peripheral device, a graphics processing device, and an external input port connectable to an external input device.

9. The method of claim 1, further comprising:
executing, by the processing device, a middleware module to interface between the at least one monitor plugin and the at least one tuning plugin, and to aggregate data collected from the at least one monitor plugin.

10. An apparatus comprising:
a processing device; and
a memory coupled to the processing device to provide instructions, and in response to the instructions, the processing device to:
monitor usage of a hardware component of a computing system to determine a load on the hardware component,
tune the hardware component based on the load determined and a weight associated with the hardware component
register at least one of a monitor plugin and a tuning plugin, wherein the at least one of the monitor plugin and the tuning plugin are associated with the hardware component; and
execute the at least one of the registered monitor plugin and the tuning plugin.

11. The apparatus of claim 10, wherein the processing device tunes the hardware component to reduce power consumption by the hardware component during execution of an application.

12. The apparatus of claim 10, wherein the processing device tunes the hardware component to improve performance by the hardware component during execution of an application.

13. The apparatus of claim 10, wherein the hardware component comprises a network card, and the processing device shuts down the network card when the usage monitored indicates that the network card has been unused over a predetermined period of time.

14. The apparatus of claim 10, wherein the hardware component comprises a disk, and the processing device causes the disk to enter a lower power mode when the usage monitored indicates that a level of activities of the disk has been dropped below a predetermined threshold over a predetermined period of time.

15. The apparatus of claim 10, wherein the at least one monitor plugin is associated with one of a plurality of categories of the hardware component and the at least one registered monitor plugin is executed to monitor the usage of the hardware component in the category.

16. The apparatus of claim 10, wherein the at least one registered tuning plugin to tune the hardware component based on a weighted load of the hardware component and a pre-selected level of tuning aggressiveness of the tuning plugin.

17. The apparatus of claim 10, wherein the one or more hardware components include a central processing unit, a disk input/output (I/O) device, a memory I/O device, a network I/O device, an I/O port connectable to a peripheral device, a graphics processing device, and an external input port connectable to an external input device.

18. The apparatus of claim 10, wherein the processing device executes a middleware module to interface between the at least one monitor plugin and the at least one tuning plugin, and to aggregate data collected from the the at least one monitor plugin.

19. A non-transitory computer-readable storage medium embodying instructions that, when executed by a processing device, will cause the processing device to perform operations comprising:

monitoring, by a processing device, usage of a hardware component of a computing system to determine a load on the hardware components;

tuning, by the processing device, the hardware component based on the load determined and a weight associated with the hardware component; and registering, by the processing device, at least one of a monitor plugin and a tuning plugin, wherein the at least one of the monitor plugin and the tuning plugin are associated with the hardware component; and executing, by the processing device, the at least one of the registered monitor plugin and the tuning plugin.

20. The non-transitory computer-readable storage medium of claim 19, wherein tuning, by the processing device, the hardware component comprises tuning the hardware component to reduce power consumption by the hardware component during execution of an application.

21. The non-transitory computer-readable storage medium of claim 19, wherein tuning, by the processing device, the hardware component comprises tuning the hardware component to improve performance by the hardware component during execution of an application.

22. The non-transitory computer-readable storage medium of claim 19, wherein the hardware component comprises a network card, and tuning the hardware component comprises:

shutting down the network card, by the processing device, when the data from the monitoring indicates that the network card has been unused over a predetermined period of time.

23. The non-transitory computer-readable storage medium of claim 19, wherein the hardware component comprises a disk, and tuning the hardware component comprises:

causing, by the processing device, the disk to enter a lower power state when the data from the monitoring indicates that a level of activities by the disk has dropped below a predetermined threshold over a predetermined period of time.

24. The non-transitory computer-readable storage medium of claim 19, wherein wherein the at least one monitor plugin is associated with one of a plurality of categories of the hardware component; and the at least one registered monitor plugin is executed to monitor the usage of the hardware component in the category.

25. The non-transitory computer-readable storage medium of claim 19, wherein the at least one registered tuning plugin to tune the hardware component based on data from the monitoring and a pre-selected level of tuning aggressiveness of the tuning plugin.

26. The non-transitory computer-readable storage medium of claim 19, wherein the one or more hardware components include a central processing unit, a disk input/output (I/O) device, a memory I/O device, a network I/O device, an I/O port connectable to a peripheral device, a graphics processing device, and an external input port connectable to an external input device.

27. The non-transitory computer-readable storage medium of claim 19, wherein the operations further comprising:

executing, by the processing device, a middleware module to interface between the at least one monitor plugin and the at least one tuning plugin, and to aggregate data collected from the at least one monitor plugin.

* * * * *